Jan. 15, 1946.  H. C. HARBERS  2,392,985
MOTOR VEHICLE STEERING MECHANISM
Filed April 3, 1943  2 Sheets-Sheet 1
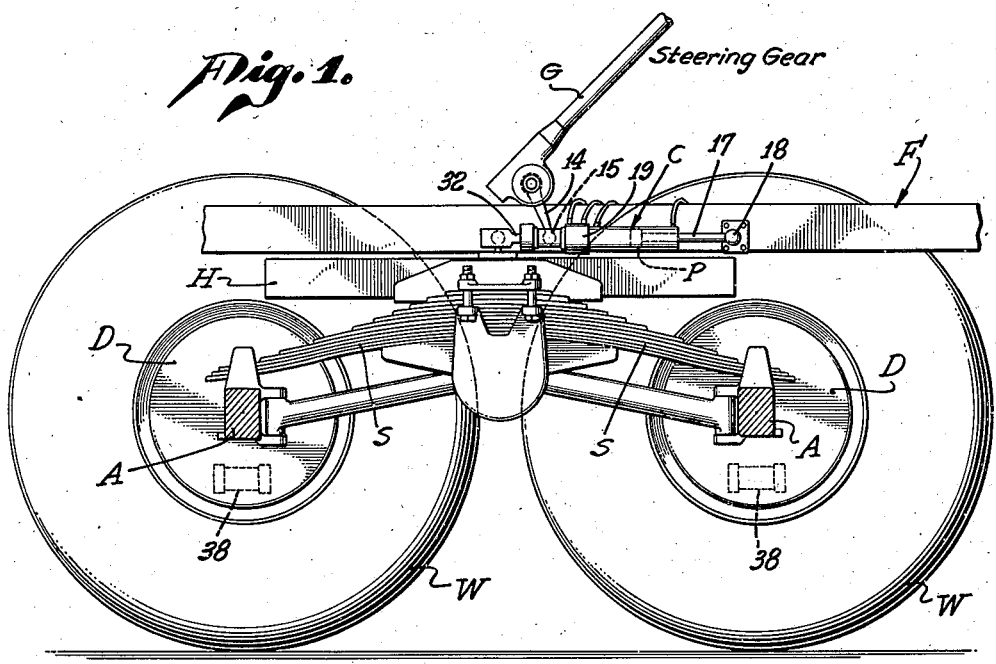
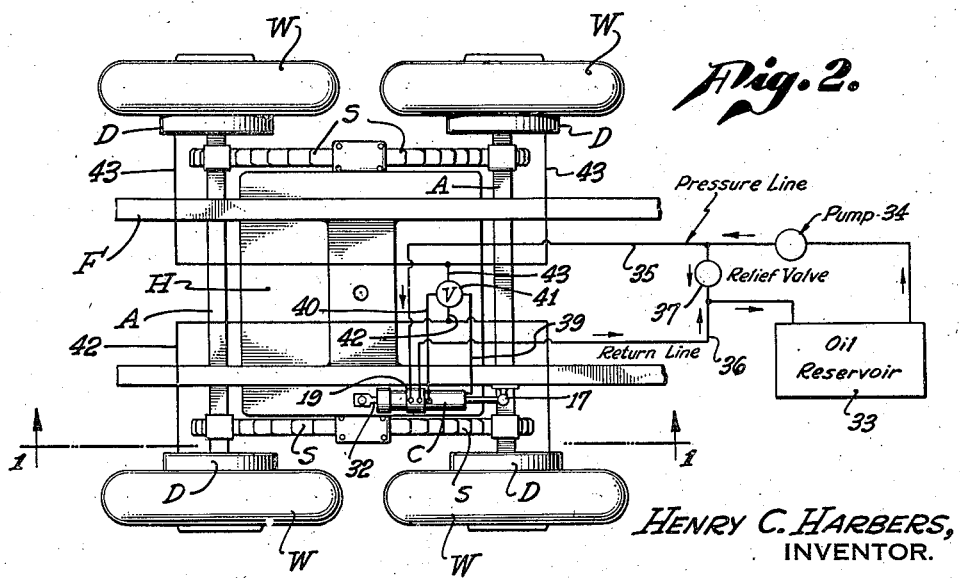
HENRY C. HARBERS,
INVENTOR.
BY Edwin D. Jones
ATTORNEY.

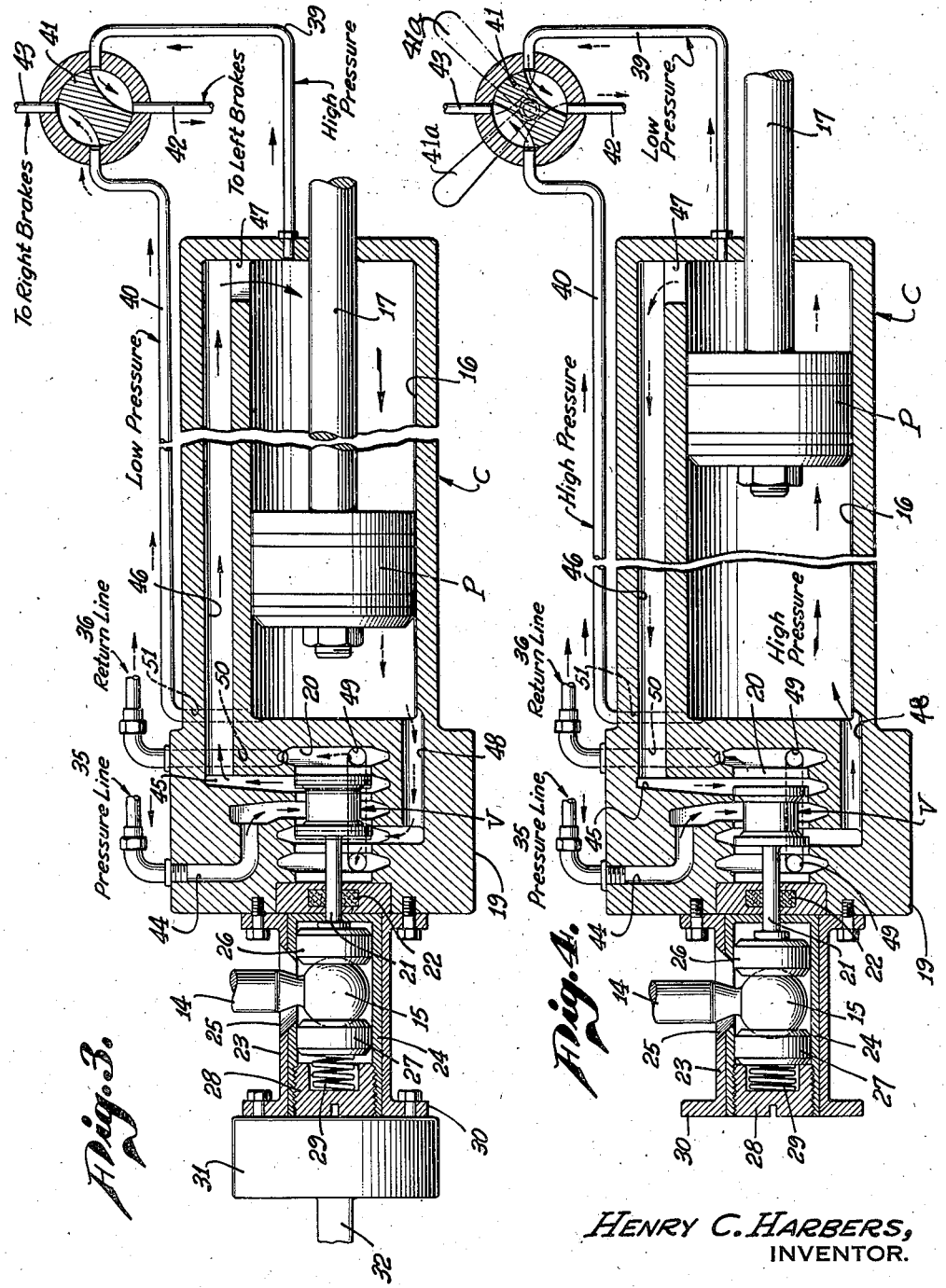

Patented Jan. 15, 1946

2,392,985

UNITED STATES PATENT OFFICE 2,392,985

MOTOR VEHICLE STEERING MECHANISM

Henry C. Harbers, San Gabriel, Calif., assignor to C. B. Equipment Co., Los Angeles, Calif., a copartnership Application April 3, 1943, Serial No. 481,728

12 Claims. (Cl. 180—18)

My invention relates to steering mechanisms for motor vehicles, and more particularly to steering mechanisms for large trucks for transporting heavy loads.

As in United States Patent No. 2,022,698 granted December 3, 1935, power operated mechanisms have been provided for control by a hand operated steering gear to effect steering movements of the dirigible traction wheels of a motor truck, and in the art such mechanisms are known as power steering boosters.

Due to the recent increase in size and carrying capacity of motor trucks, and the large military wheeled tanks now in use, the power steering boosters are insufficient to afford adequate steering, particularly under adverse steering conditions.

It is a purpose of my invention to provide a steering mechanism for motor vehicles such as trucks, tanks, and buses which, in addition to including the hand operated steering gear and the power steering booster, embodies braking devices for the dirigible traction wheels of the vehicle which are operable automatically through actuation of the booster mechanism to retard or stop rotation of the wheel or wheels to that side of the vehicle in which the latter is being steered thereby producing a differential effect of the wheels such that the steering action of the booster mechanism is greatly assisted and the mechanism as a whole rendered adequate for steering extremely heavy trucks and tanks even under the most adverse steering conditions.

Particularly because of my desire to adhere to the conventional steering booster mechanism and wheel brakes and thus minimize structural modifications, my invention in this particular embodiment is such that it can be readily incorporated in a hydraulic booster mechanism of the character disclosed in the aforementioned patent, and the conventional hydraulic wheel brakes may be employed. It is apparent, therefore, that the principle of operation of my mechanism may be incorporated in a steering gear, booster mechanism and wheel braking devices of other forms than those herein disclosed and without departing from the spirit and scope of my invention.

I will describe only one form of steering mechanism for motor vehicles embodying my invention, and will then point out the novel features thereof in claims.

In the accompanying drawings:

Fig. 1 is a vertical sectional view taken on the line 1—1 of Fig. 2, showing one form of steering mechanism embodying my invention incorporated in the front and dirigible four wheel truck unit of a motor vehicle.

Fig. 2 is a plan view of the truck unit and vehicle frame of Fig. 1, showing my steering mechanism and with the hydraulic system thereof illustrated diagrammatically.

Fig. 3 is an enlarged vertical longitudinal sectional view of the booster mechanism of Figs. 1 and 2, with a schematic illustration of the manner in which it is hydraulically associated with the brakes of the dirigible wheels of the truck unit, and that position of the valve mechanism when the booster mechanism and brakes are operative to steer the dirigible wheels in one direction.

Fig. 4 is a view similar to Fig. 3 but showing that position of the valve mechanism for causing the booster mechanism and brakes to effect vehicle steering in the other direction.

Referring to the drawings, specifically, my invention in this embodiment is shown applied to a motor vehicle frame F supported at its front end by a truck unit which may comprise four wheels W on the ends of two axles A suspended by a pair of springs S from a fifth wheel H, and by which latter the truck unit as a whole is rendered dirigible to permit steering of the vehicle.

A conventional hand operated steering gear, generally designated at G (Fig. 1), is provided which includes a steering arm 14 the free end of which is formed with a ball 15. The booster mechanism for this steering gear G is of the type disclosed in the aforementioned patent, and may comprise a hydraulic ram including a power cylinder C having a piston P reciprocable in a chamber 16 therein. The rod 17 of the piston which projects from the rear end of the cylinder C, is connected to one parallel member of the vehicle frame F by a universal joint 18.

Cast integral with the front end of the cylinder C is a valve housing 19 formed with a valve chamber 20 for a slide valve V provided with a stem 21 movable through a gland 22 into an actuating slide 23 bolted to the front end of the valve housing 19.

Within the slide 23 is a sleeve 24 and both are formed with openings 25 through which the steering arm 14 extends into the sleeve to locate the ball 15 between bearing blocks 26 and 27. The block 26 is fixed on the end of the valve stem 21, while the block 27 is retained in the sleeve 24 by a plug 28, with a take-up spring 29 interposed between the two.

The forward end of the slide 23 is formed with a flange 30 bolted to a joint member 31 to which the rear end of a drag link 32 is connected. In turn the drag link is universally connected at its forward end to the fifth wheel H so that axial movements of the actuating slide 23 effects turning movements of the truck unit in relation to the vehicle frame to afford steering movements of the vehicle.

The valve housing 19 is provided with certain passages leading to the valve chamber 20 and other passages leading from the chamber to the cylinder chamber 16 at opposite sides of the piston P. These passages constitute part of a hydraulic system for supplying fluid at operating pressures to move the cylinder forwardly and rearwardly for boosting the steering action of the steering gear G. This hydraulic system is conventional in that it includes (Fig. 2) an oil reservoir 33 having a pump 34 connected thereto to deliver the fluid under operating pressures to the valve housing 19 through a pressure line 35, and to return the fluid at a non-operating pressure to the reservoir through a return line 36. Across the lines 35 and 36, a relief valve 37 may be connected for the usual purpose.

As best shown in Fig. 1, each wheel W is provided with a braking device D by which rotation of the wheel can be retarded or stopped. In the present instance this braking device is the conventional motor vehicle brake, and is operated hydraulically by the usual ram 38.

As shown diagrammatically in Fig. 2, the four rams 38 are connected in the hydraulic system by lines 39 and 40 leading respectively from opposite ends of the cylinder chamber 16 and to a valve 41 manually operable by a handle 41a (Fig. 4). This valve is of the four way type and when in the solid line position shown in Figs. 2 and 3, conducts the pressure fluid from the lines 39 and 40 to lines 42 and 43 respectively. The line 43 leads to the rams 38 of the two brakes D for the wheels at the right side of the vehicle frame F, while the line 42 leads to the rams 38 of the two brakes for the wheels at the left side of the vehicle frame.

The operation of the entire steering mechanism, is as follows: When the vehicle is travelling forward and the steering gear G is manually operated to turn the truck unit to the left, the valve V is moved rearwardly to the position shown in Fig. 3. In this position of the valve V, fluid at high pressure flows from the line 35 into a passage 44, through the valve chamber 20, into a passage 45, then through a passage 46 and a port 47 into the right hand end of the cylinder chamber 16.

Because the cylinder C only is movable axially the pressure fluid now acts to move the cylinder rearwardly or to the right, while at the same time the low pressure fluid being expelled from the cylinder at the left side of the piston, flows through a passage 48 into the chamber 20 at the forward side of the valve V, and then through a passage 49 to the rear side of the valve, and finally through a passage 50 into the return line 36.

The extent of rearward movement of the cylinder C is determined by the degree of rearward movement of the valve V by the arm 14. As the valve housing 19 moves with the cylinder, it acts to follow up the previous movement of the valve, and once this movement is completed, the valve is restored to a neutral position in which high pressure fluid can no longer flow to the right hand end of the chamber 16, so that further movement of the cylinder ceases. This neutral position of the valve V is illustrated in broken lines in Fig. 3, and in this position the pressure line 35 is placed in communication with the return line 36 so that the fluid circulates freely back to the reservoir.

Concurrently with the aforedescribed operation of the steering gear and booster mechanism, the brakes for the two wheels W at the left side of the vehicle are applied automatically as follows:

With the admission of high pressure fluid to the right hand end of the cylinder C, a part of this fluid is conducted to the brake rams 38 for the two wheels at the left of the vehicle, through line 39, valve 41, and line 42, and thus the brakes for those two wheels are applied. It will be clear that these brakes remain applied only during the follow-up movement of the casing 19, for following completion of this movement fluid pressure no longer is supplied to the brake rams so that the brakes are free to release themselves. During this operation, the low pressure fluid expelled from the cylinder chamber 16 is partly discharged into the line 40 through a passage 51, but the pressure of this fluid is so low as to be ineffective to apply the brakes for the wheels at the right side of the vehicle.

When steering the forwardly travelling vehicle to the right through initial operation of the steering gear G, the arm 14 moves forwardly or to the left as in Fig. 4, shifting the valve V forwardly to the position shown in Fig. 4, whereby, fluid at high pressure now flows from the valve chamber 20 through passage 48 into cylinder chamber 16 at the forward side of the piston P. Forward movement of the cylinder and the housing 19 now occurs to actuate the drag link and turn the fifth wheel H in a clockwise direction and thus steer the wheels to the right. Once the valve movement stops and the follow-up movement of the housing 19 is completed to again place the valve in neutral position, forward movement of the cylinder ceases.

During this operation the low fluid pressure at the rear side of the piston passes to the return line 36 through port 47, passages 46 and 45 to passage 50 through chamber 20. Also, low pressure fluid passes from the cylinder through line 39, but is ineffective to apply the brakes for the wheels at the left of the vehicle frame. However, high pressure fluid from the cylinder chamber 16 is free to flow into the line 40 through the passage 51, and thence through the valve 41 and the line 43 to the brake rams 38 for the wheels at the right side of the vehicle, to effect application of those brakes.

To steer the vehicle when backing, it is necessary to first move the valve 41 to the broken line position shown in Fig. 4. This places the line 39 in communication with the line 43, and the line 40 in communication with the line 42. In consequence, as the booster mechanism is operated to turn the truck unit in one direction to effect rearward steering to the right, or in the other direction to effect rearward steering to the left, the brakes for the wheels on the same side as the rear end of the vehicle is being steered in, will be applied.

From the preceding operation of the steering gear, booster mechanism, and wheel brakes, it will be clear that according as the truck unit is turned in one direction or the other, those wheel brakes at one side of the vehicle or the other, depending upon in which direction the vehicle is being steered, will be automatically applied to reduce the rotational speed of the respective wheels. This produces a differential action which has the effect of causing the braked wheels to act as a pivot about which the truck unit turns, thus greatly increasing the effective turning leverage of the booster mechanism. This results in lessening the resistance offered to turning the truck unit, and renders the latter extremely responsive to produce easy steering particularly at low speeds.

An important function in the operation of my steering mechanism is that the fluid as supplied at operating pressures to one side or the other of the booster ram piston, varies in direct proportion to the resistance offered by the truck unit to turning or steering movements thereof, and once this resistance is overcome the fluid pressure drops to check further operation of the booster ram. Inasmuch as the brake rams are incorporated in the hydraulic system with the booster ram, it becomes clear that the pressure of fluid supplied to the brake rams will likewise vary in direct proportion to the resistance offered by the truck unit. Accordingly, the degree of application of the brakes and, hence, the degree of retardation in rotation of the vehicle wheels, is caused to vary automatically with the turning resistance of the truck unit.

This mode of automatic brake control eliminates the possibility, at any time, of the mechanism producing a brake application in excess of the steering resistance, and thus the steering mechanism is constantly stabilized. In other words, there can be no degree of brake application which would cause turning movement of the truck unit beyond that determined by manual movement of the steering gear, and this prevents any appreciable retardation momentarily or otherwise, in forward movement of the vehicle.

While I have shown and described my steering mechanism as including a booster mechanism controlled by a steering gear, it is to be understood that the steering gear may be dispensed with, and the booster mechanism operated through a valve manually operable to supply fluid pressure to one side of the piston or the other.

I claim:

1. In a motor vehicle; a frame; at least two dirigible traction wheels supporting one end of said frame; brakes for said wheels; a manually operable steering gear for said wheels; power booster mechanism for said steering gear controllable by the latter; and means interconnecting said brakes and said mechanism, so constructed and arranged that upon actuation of said mechanism to steer said wheels the brake for the wheel to that side of said frame in which the latter is being steered, will be applied.

2. In a motor vehicle; a frame; at least two dirigible traction wheels supporting one end of said frame; fluid actuated brakes for said wheels; a steering gear for said wheels; a fluid actuated power booster mechanism controllable by said steering gear, and means interconnecting said brakes and said mechanism so constructed and arranged that upon actuation of said mechanism to steer said wheels fluid pressure is supplied to the brake for the wheel to that side of said frame in which the latter is being steered, to apply said brake.

3. In combination; a vehicle frame; at least two dirigible traction wheels supporting one end of said frame; brakes for said wheels; a power operated steering mechanism; and means interconnecting said brakes and said mechanism so constructed and arranged that operation of said mechanism to steer said wheels in one direction or the other effects application of the brake for the wheel at that side of said frame in which the latter is being steered.

4. In a vehicle; a frame; a truck unit supporting one end of said frame and having at least two dirigible traction wheels; fluid operated brakes, one for each of said wheels; a manually operated steering gear; power operated means for said steering gear including a hydraulic ram; and means hydraulically interconnecting said brakes and said ram whereby, according as said ram is actuated to steer said wheels in one direction or the other, the brake for that wheel disposed to that side of said frame in which the latter is being steered, will be applied.

5. In a vehicle; a frame; a truck unit having a fifth wheel connection therewith and including at least two traction wheels at opposite sides of said frame; a mechanism for rotating the fifth wheel connection to effect steering of said truck unit; braking devices for said wheels; and means controllable by and operable concurrently with said mechanism for applying the braking devices for that wheel at that side of said frame in which the latter is being steered.

6. In combination; a pair of dirigible traction wheels for and at opposite sides of a vehicle; a power steering mechanism for said wheels; including a source of fluid pressure, a cylinder, a piston in said cylinder, a valve housing having a valve chamber therein, a valve movable in said chamber to occupy two open positions and a neutral position; braking devices for each of said wheels having hydraulic rams; fluid passages in said housing and said cylinder; and fluid lines connecting said valve chamber, said cylinder, and said rams whereby, according as said valve is moved to one open position or the other, pressure fluid will be supplied to said cylinder at one side of said piston or the other, and also to one hydraulic ram or the other, and when said valve is in neutral position said source will be disconnected from said cylinder.

7. A steering mechanism for a motor vehicle having at least two dirigible traction wheels at opposite sides of the vehicle, with fluid operated brakes therefor; comprising fluid operated mechanism for steering said wheels including a ram; and a hydraulic system including said mechanism and said brakes, constructed, arranged, and operating to supply fluid to one side of the ram or the other, and to one brake or the other according as said wheels are steered in one direction or the other, and at pressures which vary in direct proportion to the steering resistance offered by said wheels.

8. In a motor vehicle; a frame; at least two dirigible traction wheels supporting the forward end of said frame at opposite sides thereof; brakes for said wheels; a manually controlled power mechanism for steering said wheels; an operative connection between said brakes and said mechanism for causing actuation of said brakes through operation of said mechanism; and control means for said connection which is adjustable to one position in forward steering of said wheels, to brake that wheel at the same side as the forward end of the vehicle is being steered in, and to another position in rearward steering of said wheels, to brake that wheel at the same side as the rear end of the vehicle is being steered in.

9. In a motor vehicle; a frame; at least two dirigible traction wheels supporting the forward portion of said frame at opposite sides thereof; manually controlled hydraulic mechanism for steering said wheels; hydraulic brakes for said wheels; a hydraulic connection between said brakes and said mechanism for causing actuation of said brakes through operation of said mechanism; and a valve included in said connection which is adjustable to one position in forward steering of said wheels, to brake that wheel at the same side as the forward end of the vehicle is being steered in, and to another position in rearward steering of said wheels, to brake that wheel at the same side as the rear end of the vehicle is being steered in.

10. In a motor vehicle; a frame; at least two dirigible traction wheels supporting one end of said frame; brakes for said wheels; a manually operable steering gear for said wheels; power booster mechanism for said steering gear controllable by the latter; and means interconnecting said brakes and said mechanism, so constructed and arranged that upon actuation of said mechanism to steer said wheels the brake for the wheel to that side of said frame in which the latter is being steered, will be applied in direct proportion to the steering resistance offered by said wheels.

11. A steering mechanism for a motor vehicle having at least two dirigible traction wheels at opposite sides of the vehicle, with fluid operated brakes therefor; comprising fluid operated mechanism for steering said wheels including a ram; and a hydraulic system including said mechanism and said brakes, constructed, arranged, and operating to supply fluid to one side of the ram or the other, and to one brake or the other according as said wheels are steered in one direction or the other.

12. A steering mechanism for a motor vehicle having at least two dirigible traction wheels at opposite sides of the vehicle, with fluid operated brakes therefor; comprising fluid operated mechanism for steering said wheels; and a hydraulic system including said mechanism and said brakes, constructed and arranged to operate one brake or the other according as said wheels are steered in one direction or the other, and in direct proportion to the steering resistance offered by said wheels.

HENRY C. HARBERS.